United States Patent [19]

Hendricks

[11] Patent Number: 5,386,583

[45] Date of Patent: Jan. 31, 1995

[54] HIGH PERFORMANCE SORT HARDWARE ACCELERATOR IN A DATA PROCESSING SYSTEM INCLUDING A PLURALITY OF COMPARATOR MODULES

[75] Inventor: Jerry E. Hendricks, Poughkeepsie, N.Y.

[73] Assignee: International Business Machines Corporation, Armonk, N.Y.

[21] Appl. No.: 87,438

[22] Filed: Jul. 6, 1993

Related U.S. Application Data

[63] Continuation of Ser. No. 721,023, Jun. 26, 1991, Pat. No. 5,265,260.

[51] Int. Cl.6 .................................................. G06F 7/08
[52] U.S. Cl. .................... 395/800; 364/DIG. 1; 364/DIG. 2; 364/962.3
[58] Field of Search ............... 364/DIG. 1 MS File, 364/DIG. 2 MS File; 395/375, 600, 650, 700, 800

[56] References Cited

U.S. PATENT DOCUMENTS

| | | |
|---|---|---|
| 3,713,107 | 1/1973 | Barsamian ........................... 395/800 |
| 4,567,572 | 1/1986 | Morris et al. ........................ 395/800 |
| 4,584,664 | 4/1986 | Burrows ............................. 395/800 |

OTHER PUBLICATIONS

Donald E. Knuth, "The Art of Computer Programming" vol. 3; Addison Wesley, Reading, Mass. (1973), pp. 220-235.

Primary Examiner—Robert B. Harrell
Attorney, Agent, or Firm—Whitham, Curtis, Whitham & McGinn

[57] ABSTRACT

A database accelerator that uses the Van Voorhis sort network is implemented as a state machine using the same hardware in succeeding cycles. The database accelerator comprises high performance sort (HPS) hardware that includes working store elements for storing data records to be sorted, a plurality of comparator modules, control read only memories (ROMs), and storage control elements (SCEs). The SCEs direct respective pointer arrays and storage elements, and the storage elements provide addresses to the working store elements, which in turn feed data to the comparator modules. The control ROMs provide control signals to each comparator module as well as global control for the HPS hardware.

13 Claims, 7 Drawing Sheets

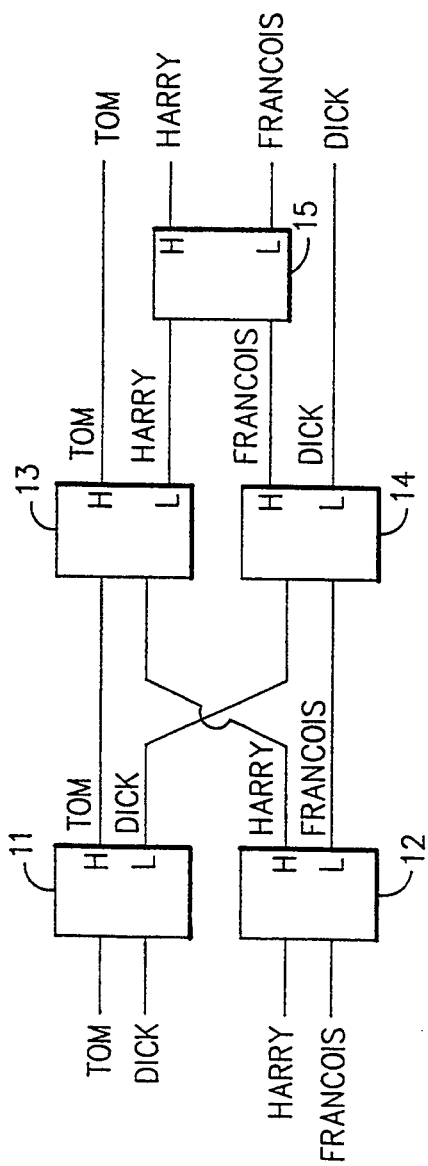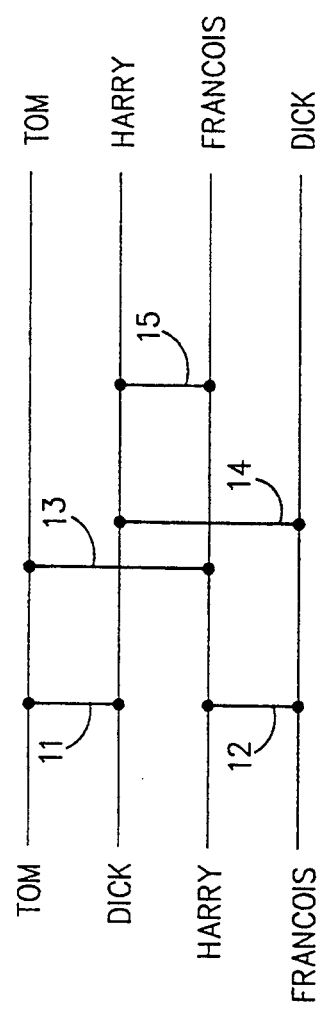

HIGH PERFORMANCE SORT HARDWARE ACCELERATOR IN A DATA PROCESSING SYSTEM INCLUDING A PLURALITY OF COMPARATOR MODULES

This is a continuation of application Ser. No. 07/721,023 filed Jun. 26, 1991, now U.S. Pat. No. 5,265,260.

BACKGROUND OF THE INVENTION

1. Field of the Invention

The present invention generally relates to a hardware implementation of sort and merge operations in a data processing system and, more particularly, to high performance sort hardware for a database accelerator. In a specific application, the invention is directed to electronic circuitry which implements the Van Voorhis n=16 sort network.

2. Description of the Prior Art

In database operations, the sort operation takes a list of elements, such as Tom, Dick, Harry, and Francois, and rearranges them in ascending or descending order based on alphabetic or numeric value of each character as, for example, Tom, Harry, Francois, and Dick.

Donald E. Knuth in *The Art of Computer Programming*, Vol. 3, *Sorting and Searching*, Addison-Wesley, Reading, Mass., (1973), describes sort networks as a collection of comparators. As illustrated in FIG. 1, each comparator 11, 12, 13, 14, and 15 has two inputs and two outputs. The input comparator 11 receives the elements Tom and Dick, in this example, while the input comparator 12 receives the elements Harry and Francois. These comparators order the input elements according to a prescribed order such that, in this case, the Tom and Dick elements are, respectively, high (H) and low (L) order outputs of input comparator 11, and the Harry and Francois elements are, respectively, H and L order outputs of input comparator 12. The H order outputs of input comparators 11 and 12 are connected to the inputs of comparator 13, and the L order outputs of the input comparators 11 and 12 are connected to the inputs of comparator 14. Again, these comparators order their respective input elements according to a prescribed order such that, in this case, the Tom and Harry elements are, respectively, the H and L outputs of comparator 13 and the Francois and Dick elements are, respectively, the H and L outputs of comparator 14. The L output from comparator 13 and the H output of comparator 14 are connected to the inputs of comparator 15, which outputs the Harry element as its H output and the Francois elements as its L output, thereby providing the ordering Tom, Harry, Francois, and Dick.

Sort networks are conventionally represented by graphs of the type shown in FIG. 2 where data flows left to right, vertical lines represent comparators, and dots show comparator input and output. The graph shown in FIG. 2 represents the sort network of FIG. 1. See Knuth, supra, "Networks for Sorting", pp. 220-235. Knuth states that the best sorting networks currently known were constructed by D. Van Voorhis in 1974. His networks require $\frac{1}{2}n(\lg n)^2 - \alpha n \lg n + O(n)$ comparators, where n is the number of elements to be sorted and $\alpha \approx 0.395367$. FIG. 3 is a graph similar to FIG. 2 for the Van Voorhis n=16 network. This network sorts a list of sixteen elements using sixty-one comparator modules. This network has a "delay" of nine because the longest path goes through nine comparators.

Clearly, there is a problem in implementing the Van Voorhis algorithm since sixty-one comparator modules are required. Current thermal conduction modules (TCMs) may contain up to 121 integrated circuit (IC) chip sites. In IBM System/370 architecture using a 32-bit word, comparators would need to be able to operate on two quadwords (QWs). Thus, if one comparator were implemented in a single chip, then that chip would have two QW inputs and two QW outputs, i.e., 128 bits each plus sixteen error checking and correcting (ECC) bits. Each chip would therefore require at least 576 pins, and 288 pins on each of the chips would switch simultaneously. This would not be a viable TCM design.

SUMMARY OF THE INVENTION

It is therefore a general object of the present invention to provide a hardware implementation of sort and merge operations in a data processing system.

It is another object of the invention to provide high performance sort hardware for a database accelerator.

It is a further and more specific object of the invention to provide a practical hardware solution to the implementation of the Van Voorhis sort network.

The invention is a database accelerator that uses the Van Voorhis sort network and is implemented as a state machine using the same hardware in succeeding cycles. The database accelerator comprises high performance sort (HPS) hardware that includes working store elements for storing data records to be sorted, a plurality of comparator modules, control read only memories (ROMs), and storage control elements (SCEs). The SCEs direct respective pointer arrays and storage elements, and the storage elements provide addresses to the working store elements, which in turn feed data to the comparator modules. The control ROMs provide control signals to each comparator module as well as global control for the HPS hardware.

The comparator modules each include cache-like stores for storing records from the working store elements and providing high speed access to stored records. The comparator modules each further include comparators for selecting the stored records in a predetermined ascending or descending order and generating outputs according to the predetermined order. The control ROMs load the outputs of the plurality of comparator modules in the working store elements in a sequence of cycles which implements the sort algorithm as a state machine.

According to the preferred embodiments of the invention, the HPS hardware implements the Van Voorhis n=16 sort network as described by Donald E. Knuth, supra. The HPS hardware sorts elements known as quadwords (QWs) which comprise sixteen bytes. The HPS hardware sorts sixteen QWs in nine machine cycles, performs a sort-merge on sixteen presorted QW lists producing one merge output every nine machine cycles, and performs a parallel merge of sixteen presorted QW lists simultaneously, producing eight merge outputs every machine cycle.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a block diagram illustrating a collection of comparators for implementing a simple sort algorithm;

FIG. 2 is a graph representing the sort network shown in FIG. 1;

two bits arrive in the next cycle, thus avoiding simultaneous switching problems. The logical arrays are each organized as a 17×144 matrix.

Table 1 shows the determination of inputs for each comparator module for each of the nine cycles, denoted #1 to #9. These inputs are multiplexed at the inputs to the comparator modules. In Table 1, the term HA refers to the high or H output of comparator A, LE refers to the low or L output of comparator E, and so forth.

TABLE 1

| cycle | Comparator Inputs | | | | | | | |
|---|---|---|---|---|---|---|---|---|
| | A | B | C | D | E | F | G | I |
| #1 | 1.2 | 3.4 | 5.6 | 7.8 | 9.10 | 11.12 | 13.14 | 15.16 |
| #2 | HA.HB | LA.LB | HC.HD | LC.LD | HE.HF | LE.LF | HG.HI | LG.LI |
| #3 | HA.HC | HB.HD | LA.LC | LB.LD | HE.HG | HF.HI | LE.LG | LF.LI |
| #4 | HA.HE | HB.HF | HC.HG | HD.HI | LA.LE | LB.LF | LC.LG | LD.LI |
| #5 | HB.HC | HD.LE | HE.LA | HF.LC | HG.LB | HI.LD | LF.LG | — |
| #6 | HA.HC | LA.LC | HB.LD | HD.LE | HE.LB | HF.HG | LF.LG | — |
| #7 | HB.LA | HC.HD | HE.LB | HF.LD | LC.LE | HG.LF | — | — |
| #8 | — | HB.HC | LB.LC | HD.HE | LD.LE | — | — | — |
| #9 | LA.HB | HC.LB | HD.LC | HE.LD | HF.LE | — | — | — |

Figure 5:
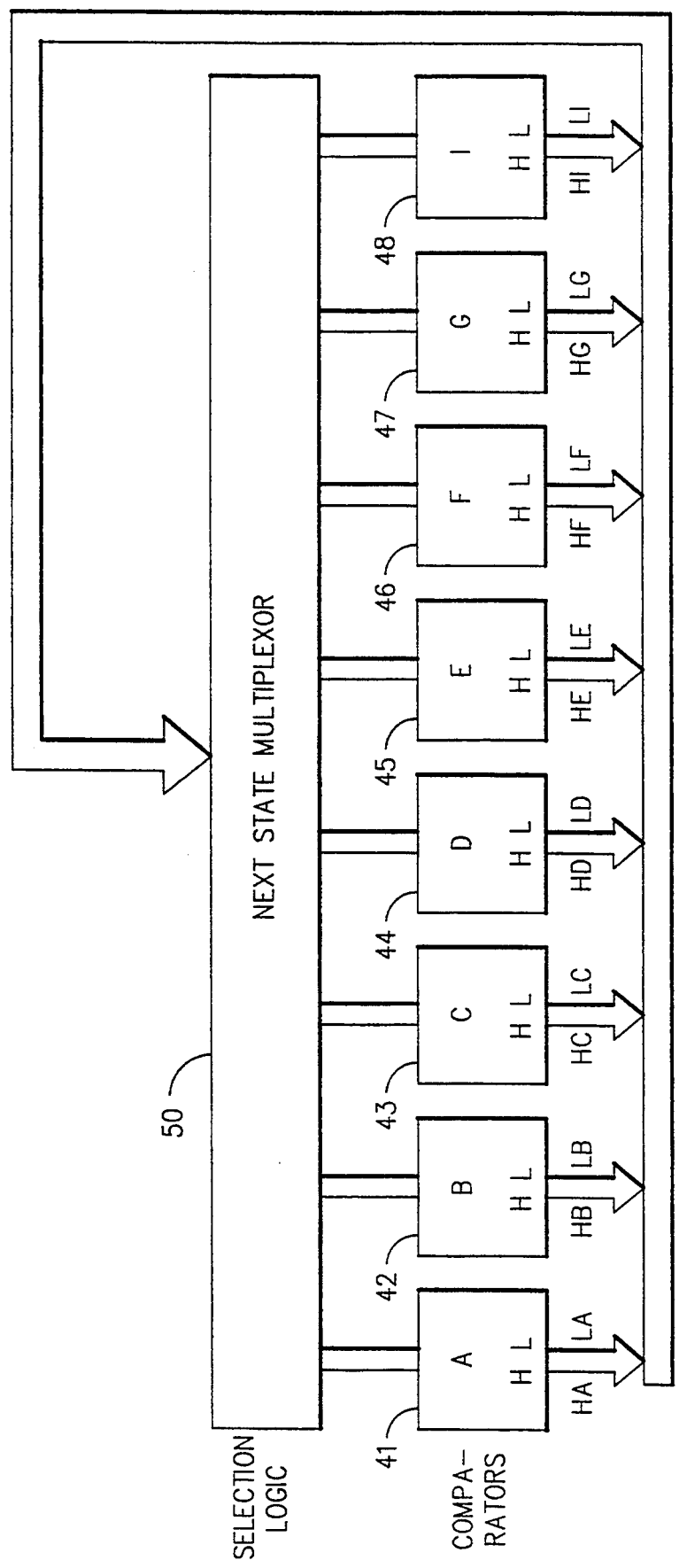
Figure 6:
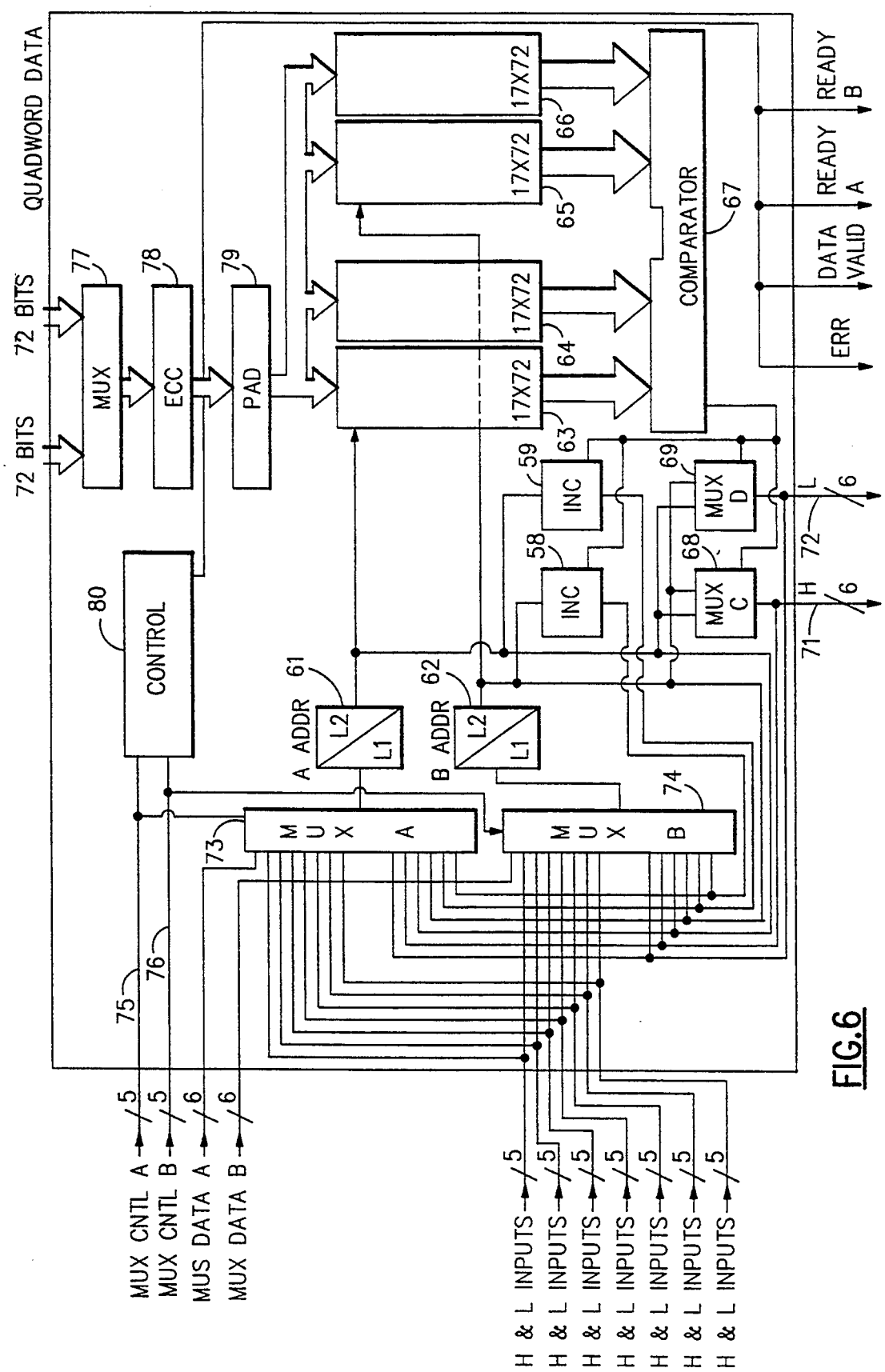
Figure 7:
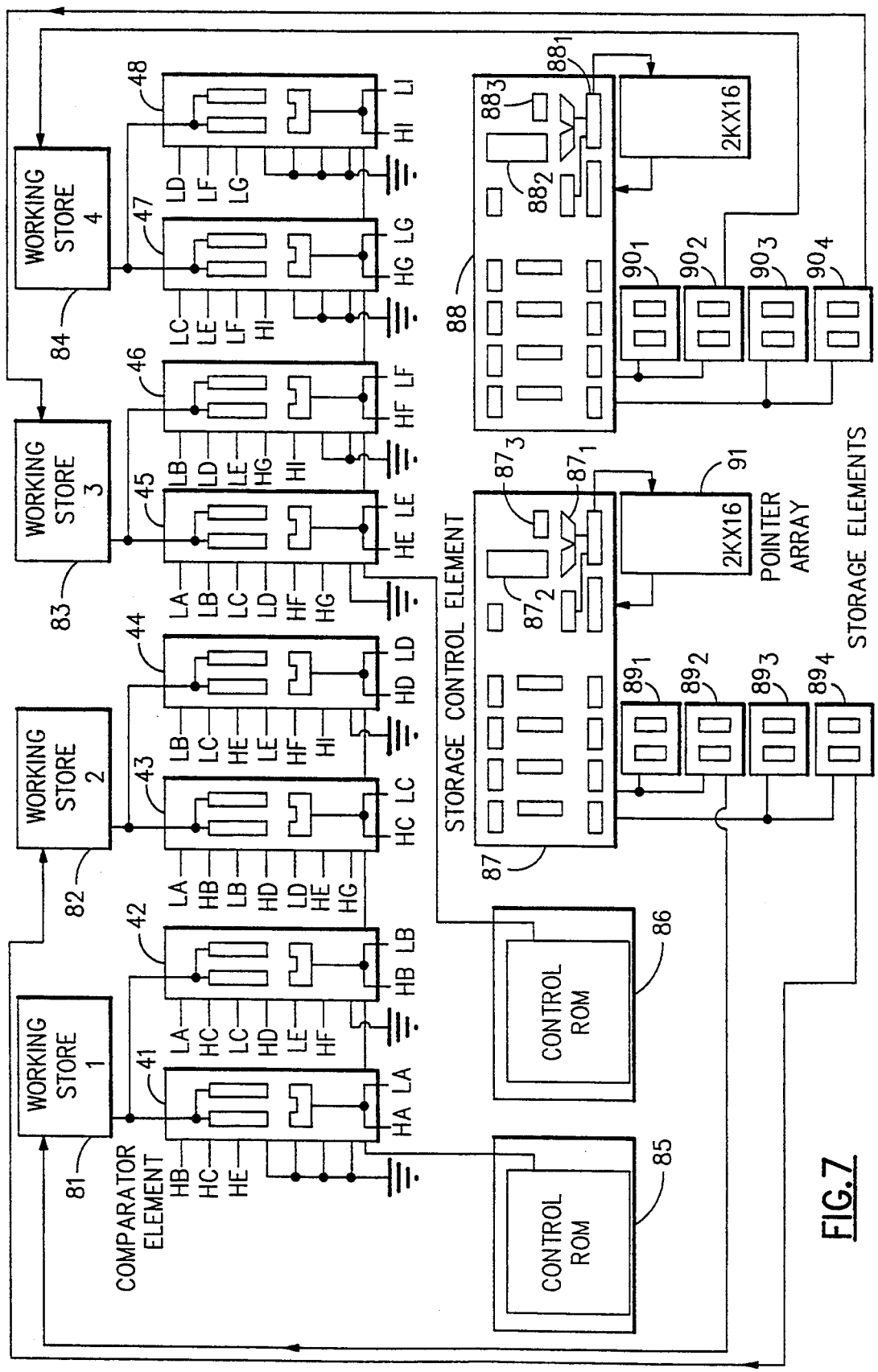
Figure 8:
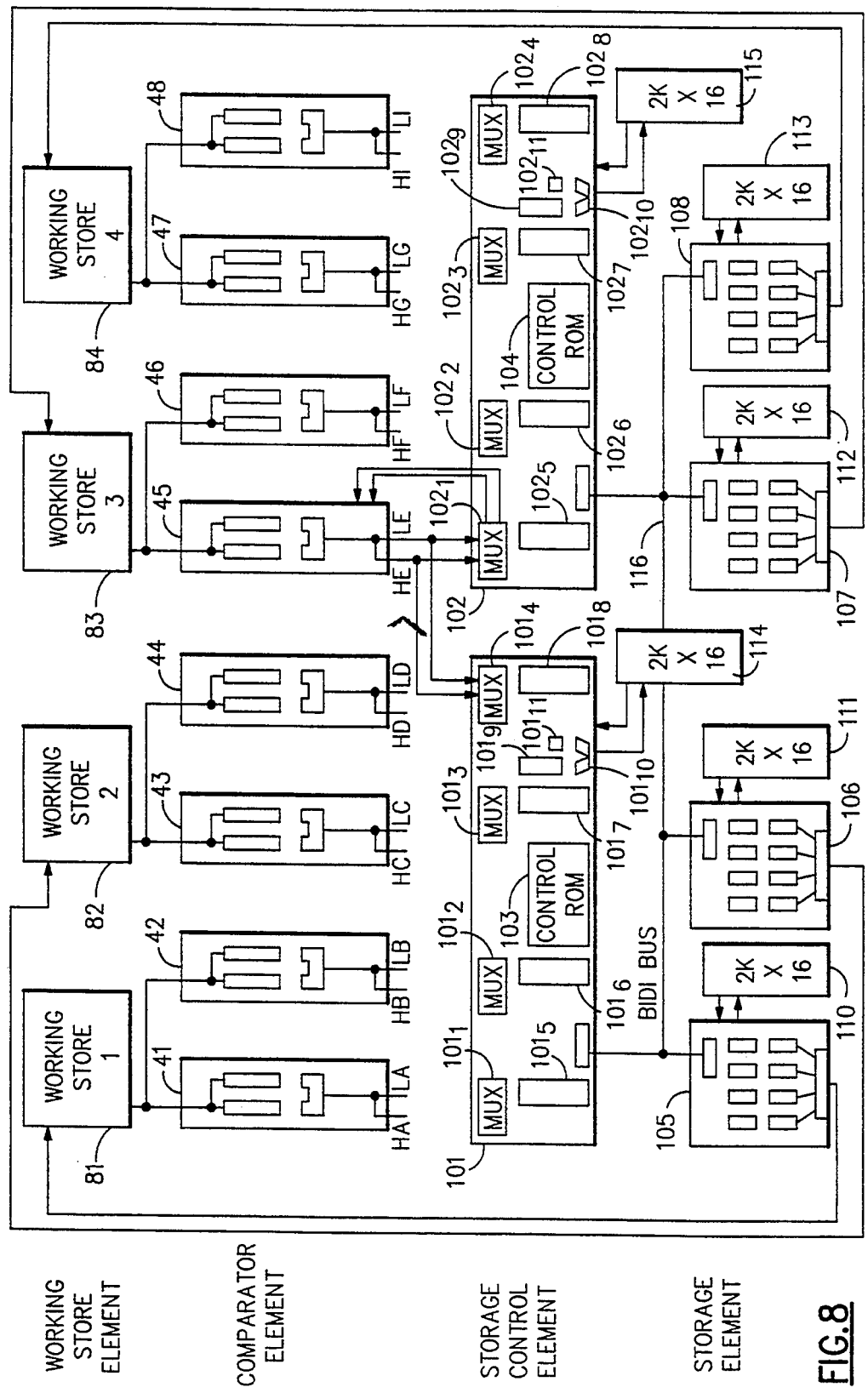

FIG. 5 is a block diagram showing the state machine implementation using the eight comparator modules;

FIG. 6 is a block diagram of a high performance sort comparator chip according to the invention;

FIG. 7 is a block diagram of a first embodiment of the high performance sort system according to the invention; and FIG. 8 is a block diagram of a second embodiment of the high performance sort system according to the invention.

DETAILED DESCRIPTION OF THE PREFERRED EMBODIMENTS OF THE INVENTION

Figure 3:
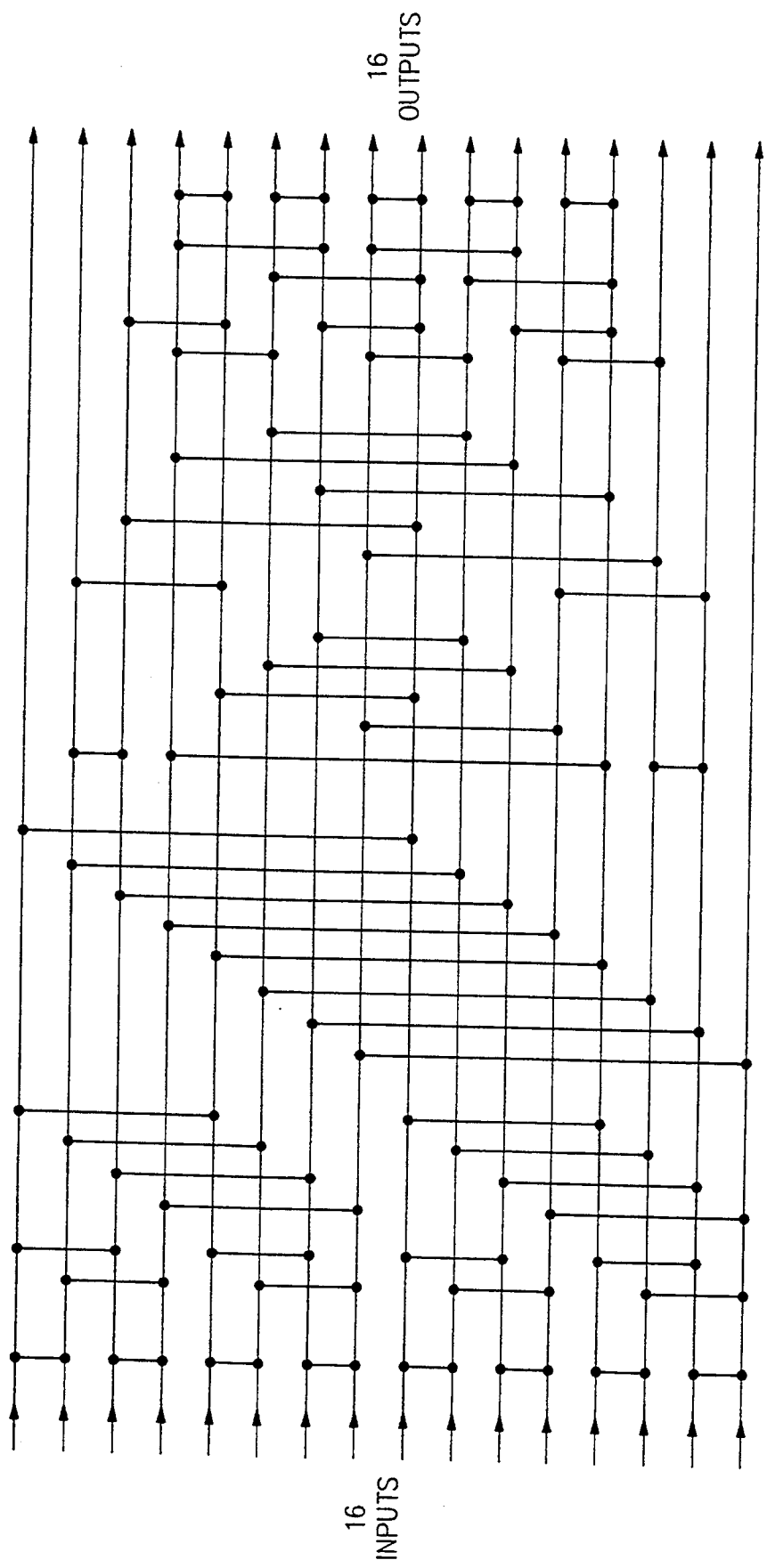
FIG. 3 is a graph similar to the type of graph shown in FIG. 2 representing a Van Voorhis n=16 network.
Figure 4:
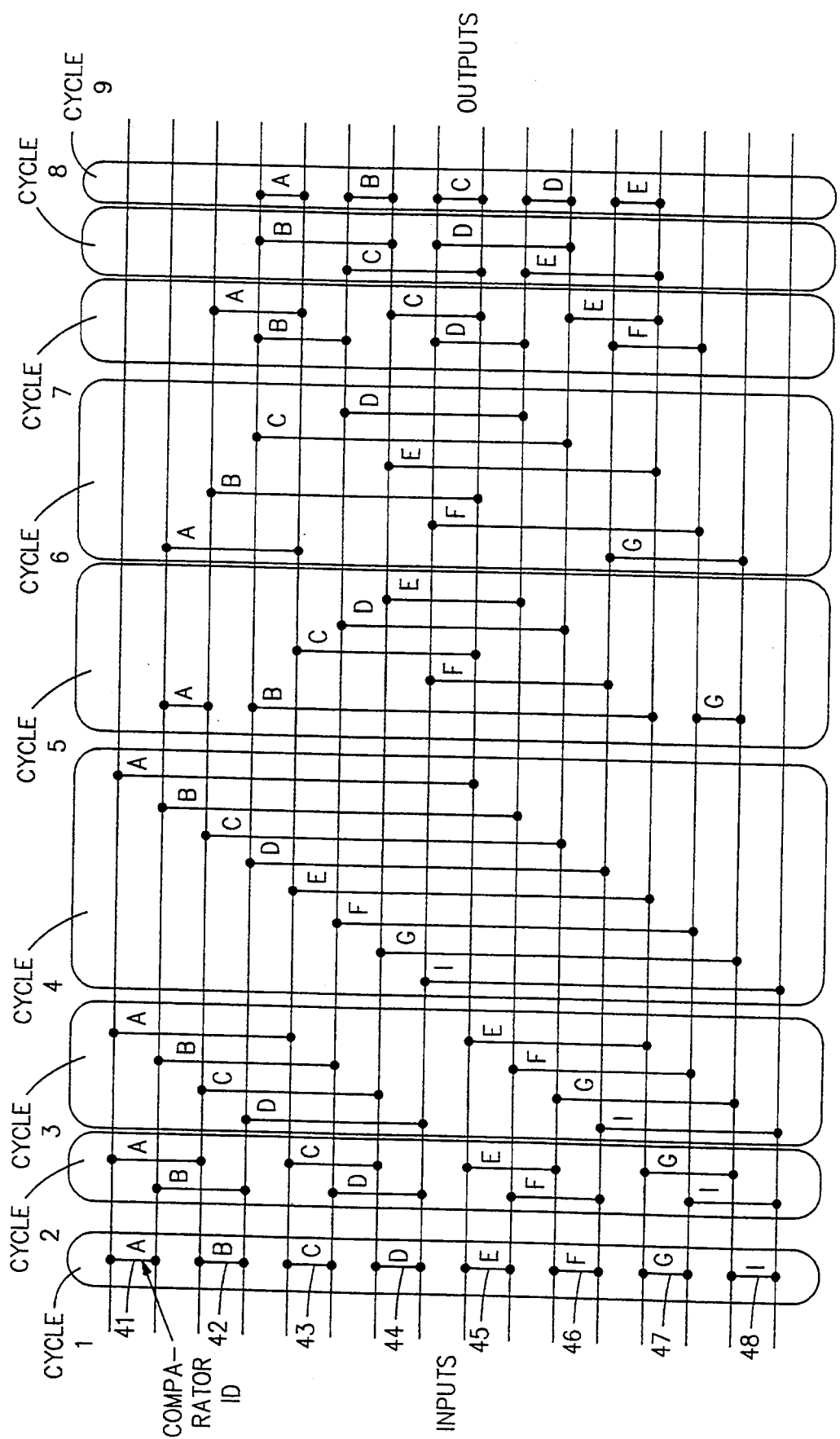
FIG. 4 is the graph of FIG. 3 marked to illustrate an implementation with eight comparator modules operating in nine cycles.

The high performance sort (HPS) hardware according to the preferred embodiments of the invention is based on the following analysis of the Van Voorhis network as represented in the graph of FIG. 3. First, instead of using sixty-one comparator modules, the network is implemented as a state machine with only eight comparator modules. The eight comparator modules are represented in the graph shown in FIG. 4 by the reference numerals 41 to 48, denoted as comparator modules A, B, C, D, E, F, G, and I. These eight comparator modules operate as a state machine in nine cycles, labeled Cycle 1 to Cycle 9 in FIG. 4, to perform the sort operation. The state machine implementation is shown in FIG. 5 where each of the eight comparator modules 41 to 48 are shown in block diagram form with two inputs and two outputs. The inputs are initially provided by a next-state multiplexer 50. The multiplexer 50 also receives the outputs of the comparator modules from a preceding cycle and steers those outputs to the inputs for the next cycle. An external control read only memory (ROM) element (not shown) controls the multiplexer 501.

Second, instead of having each comparator module accommodate two QWs of input data and two QWs of output data, two imbedded logical arrays are implemented in each comparator module. These arrays function as a high speed cache. When all eight comparator modules have their imbedded arrays filled with the same data, only the address of the data (comprising six bits) needs to be transferred to neighboring comparator modules. A single QW (144 bits) input is used to fill the arrays, and a six bit H output and six bit L output are generated. The QW input is designed so that seventy- FIG. 6 shows the logic of an HPS comparator module. In FIG. 6, the addresses of the two QWs to be compared leave registers 61 and 62, denoted as "A ADDR" and "B ADDR" and go to the imbedded arrays 63, 64 and 65, 66, respectively. The two QWs exit the imbedded arrays and are sent to the comparator 67. The comparator output (i.e., less than, greater than, or equal to) is used as a multiplexer control for multiplexers 68 and 69, denoted "MUX C" and "MUX D" to send the address of the higher value to port 71, denoted as port "H", and the address of the lower value to port 72, denoted as port "L". The "H" and "L" addresses are also looped back to the input multiplexers 73 or 74, denoted as "MUX A" and "MUX B" to be used as possible inputs for the next state of address registers 61 and 62. This sequence transpires in one machine cycle. The incrementers 58 and 59 are used to increment the address of the array with the largest (or smallest) data record.

The source of the next-state address to registers 61 and 62 is controlled externally by a control ROM element (not shown) which sends the appropriate Van Voorhis state through the control lines 75 and 76, denoted "MUX CNTL" every cycle. If timing allows, the input multiplexer, i.e., multiplexer 73 or multiplexer 74, can be moved to storage control modules. This reduces the pin count on the comparator chip and storage control chip and reduces the fanout on the "H" and "L" lines 71 and 72.

The multiplexer 77 is used in the comparator modules to select between the high order bits or most significant (MSB) seventy-two bits or the low order or least significant (LSB) seventy-two bits that are attached to the working store arrays 81 to 84 in FIG. 7. Only seventy-two bits are activated at a time even though a total of 144 bits are connected. This allows normal off-the-shelf IC memory chips to be used in the working store; otherwise, the working store memory chips would have to do the multiplexing.

When the proper seventy-two bits pass through the multiplexer 77, the ECC unit 78 in FIG. 6 does error checking and correcting on the seventy-two bits that are transferred from the working store units 81 to 84 in FIG. 7 to the comparator modules. After the seventy-two bits have been checked by the ECC unit 78, and corrected if need be, the PAD unit 79 is used to overlay a default single-byte or double-byte pad character into unused byte locations in one of two ways, as follows:

1) Pad a short data record to a quadword length
   a) if a data record is sixteen characters long, i.e., INTERCONTINENTAL, it is exactly one quadword long and does not require padding, or
   b) if a data record is less than sixteen characters long, i.e., INTERN, it is padded with the default pad character "p" so that it becomes sixteen characters long, i.e., INTERNpppppppppp.
2) If the total number of data records to be sorted is less than sixteen, then the missing records are substituted with a record consisting of all pad characters, i.e., pppppppppppppppp.

The control section 80 provides sequencing and control to the various sections of the comparator module and reports any detected error conditions, such as an error condition from the ECC unit 78, as well as status of the internal arrays 63 to 66.

The system configuration of a first preferred embodiment is shown in FIG. 7. The working stores 81 82, 83, and 84 are each filled with 2048 fields, each field being one QW only. These provide the inputs to the eight comparator modules 41 to 48. The control ROMs 85 and 86 provide the microcode control signals to comparator modules 41 to 44 and 45 to 48, respectively. The outputs of the comparator modules are supplied to storage control elements (SCEs) 87 and 88 each of which have attached four storage elements $89_1$ to $89_4$ and $90_1$ to $90_4$ and a pointer array 91 and 92, respectively. Each SCE 87 and 88 directs its pointer array and the storage elements attached to it.

The purpose of the SCEs 87 and 88 is to provide an address to the working store memories 81 to 84 so that the working store memories can output the appropriate data record to the comparator modules 41 to 48. The SCEs have special hardware to do a two-stage address translation because the output of the comparator modules is in the form of a 6-bit index representing one of seventeen data records in the comparator module, but the input address to the working store memories is a 16-bit real address.

The pointer arrays 91 and 92 are used to facilitate this address translation. Each pointer array can hold 2048 elements, each element being sixteen bits. These elements are addresses of the data records in the working stores. Each pointer array 91 and 92 therefore can contain up to 2048 addresses for up to 2048 data records that may be in the working stores.

The SCEs 87 and 88 are each provided with respective arithmetic logic units (ALU) $87_1$ and $88_1$ having two inputs. One input is from a result register, $87_2$ and $88_2$, respectively, in the SCE containing the indices from the comparator modules. At the end of the sort operation for sixteen data records, the indices in the result register are in sorted order. The other input to each of the ALUs is a register, $87_3$ and $88_3$, respectively, which contains an offset, to indicate which group of sixteen data records are being sorted.

In actual hardware, when the first group of sixteen data records are being sorted, the offset is zero, and the indices in the result register will be from "0" to "15" in sorted order. These indices correspond to the data records whose addresses are in the first sixteen locations in the pointer arrays. When the second group of sixteen data records are being sorted, the offset is one and the indices in the result register will be from "0" to "15" in sorted order. These indices correspond to the data records whose addresses are in the second sixteen locations in the pointer arrays.

The ALU in each SCE is used to multiply the offset by sixteen (i.e., shift left four times) and add the result to an index. This results in an address, ADDRESS_P, to the pointer arrays 91 and 92. The data element in the pointer array at ADDRESS_P is a 16-bit address, ADDRESS_W. ADDRESS_W is used in the working store memories 81 to 84 to point to the data record. The ADDRESS_W value is read out of the pointer array 91 into the SCE 87, for example, and sent to the storage elements $89_1$, $89_2$, $89_3$, and $89_4$. The storage elements each contain two 256-element arrays to store the ADDRESS_Ws. The two arrays, operating in ping-pong fashion, are needed for the storage operation. During parallel merge operation, each storage element will initially contain the ADDRESS_Ws for one Comparator module.

When a comparator module requires a new data record, the appropriate storage element $89_1$ to $89_4$ or $90_1$ to $90_4$ outputs an ADDRESS_W to the working store memories. The working store memories then output the data record seventy-two bits at a time to the comparator module. Note that there are only four storage elements for each SCE 87 and 88 that output ADDRESS_W values because there are only four working store elements 81 to 84, with one working store element serving two comparator modules.

Next, the ALU in each SCE functions as a counter and generates ADDRESS_Ps in sequence which are used to access the data records in the working store memories in sequence for the initial sort operation. The address translation performed by the SCE is commonly used in virtual address memory systems but is applied here to ensure that there are no bottlenecks in feeding data records to the comparators at a throughput rate that does not restrict the speed advantage gained by sorting sixteen data records in nine cycles.

Tables 2 and 3 describe the analysis of the Van Voorhis Sort Network to determine the physical input requirements for each comparator module 41 to 48 shown in FIG. 7 during the nine cycles. Table 2 lists the common term reduction at each of the comparators, and Table 3 lists the full reduction, native term elimination at each of the comparators.

TABLE 2

| | | | | Common Term Reduction | | | | | |
|---|---|---|---|---|---|---|---|---|---|
| A | B | | C | D | | E | F | G | I |
| HA | LA | LA | LB | LA | LA | LB | LC | LA | LB | LB | LD | LC | LG | LD | LI |
| LA | HB | HB | HC | HB | LB | LC | LD | LC | LE | LE | LF | LE | HI | LF | |
| HB | HC | HC | LC | LB | LC | HD | HE | LD | HF | HF | HG | LF | | LG | |
| | HE | HD | HD | HC | LD | HE | LE | HE | HG | HG | HI | HG | | | |
| | | | | LE | HD | HD | HF | HI | HF | | HI | | | | |
| | | | | HF | HE | HG | | | HG | | | | | | |

TABLE 3

Full Reduction, Native Term Elimination

| A | B | C | D | E | F | G | I |
|---|---|---|---|---|---|---|---|
| HB | LA | LA | LB | LA | LB | LC | LD |
| HC | HC | HB | LC | LB | LD | LE | LF |
| HE | LC | LB | HE | LC | LE | LF | LG |
|    | HD | HD | LE | LD | HG | HI |    |
|    | LE | LD | HF | HF | HI |    |    |
|    | HF | HE | HI | HG |    |    |    |
|    |    | HG |    |    |    |    |    |

The following diagram shows the derivation of Tables 2 and 3 from Table 1.

| TABLE 1 A | TABLE 2 A | TABLE 3 A |
|---|---|---|
| 1-2 | HA# HB* | HB |
| HA·HB | HB  HC | HC |
| HA*·HC | LA# HE | LE |
| HA*·HE | LA# |    |
| HB·*HC |    |    |
| HA*·*HC |    |    |
| HB*·LA |    |    |
| — |    |    |
| LA·*HB |    |    |

*denotes common terms which are discarded denotes a native term which is discarded. Note that HA and LA are native terms for comparator A, HB and LB are native terms for comparator B, etc. These are supplied by MUXC 68 and MUXD 69.
*denotes common term which is discarded.

For the embodiment shown in FIG. 7, the Hx and Lx output of each comparator is connected directly to multiplexers 73 and 74 in FIG. 6 ports which are drawn on the left side of each comparator. It is desirable that each of the eight comparator modules 41 to 48 in FIG. 7 be identical, so that a single comparator module can perform the function of the eight modules.

Table 3 shows the minimum requirements of each of the eight comparators Note that comparator "C", i.e., comparator 43 in FIG. 7, has seven distinct inputs on the left hand side, which is the maximum number. Therefore, all comparators have seven inputs, the unused inputs on a comparator being tied to ground or logical "0".

The architecture of the system shown in FIG. 7 is designed to be fault tolerant. For example, if any of the eight comparator modules 41 to 48 fails, the microprogram of control ROM elements 85 and 86 reconfigure the Van Voorhis algorithm to work with seven comparators in thirteen cycles. The ROM elements contain ten separate microprogram sequences used to direct the comparator. These sequences include a sequence for all eight comparators being functional, denoted as sequence one, eight different sequences for the various possibilities of one of the comparators being non-functional, denoted as sequences two to nine, and a sequence for only four of the comparators being functional, denoted as sequence ten. Normally, the sequence one for all eight comparators being functional is used. If a single comparator module is determined to be nonfunctional, then the appropriate sequence two to nine for that condition is used. If one of the two control ROM elements 85 and 86 fails, four comparator modules, i.e., 41 to 44 or 45 to 48, are dropped, and the system continues operation at reduced speed using sequence ten.

The microprogram sequence ten is partitioned so that ROM 85 contains the controls for comparator modules 41, 42, 43, and 44, while ROM 86 contains the controls for comparator modules 45, 46, 47, and 48. If one of the ROM elements fails, then the functional ROM element runs microprogram sequence ten for its four comparator modules which remain functional.

If one of the two SCEs 87 or 88 fails, the corresponding four comparator modules are dropped, and the system continues operation at reduced speed. SCE 87 is used to control the ADDRESS_Ws for the four comparator modules 41 to 44, and SCE 88 is used to control the ADDRESS_Ws for the four comparator modules 45 to 48. If, for example, SCE 87 were to fail, then data records cannot be loaded into comparator modules 41 to 44. This failure has the same implications of a failure of ROM 85; therefore, ROM 86 runs microprogram sequence ten for its four comparator modules.

If one of the two pointer array elements 91 or 92 fails, the four comparator modules for that SCE are dropped, and the system runs at reduced speed. Pointer array 91 is used to hold the ADDRESS_Ws for the data records in the working store memories for the four comparator modules 41 to 44. If this pointer array fails, address translation cannot be performed for these comparator modules. Again, this failure has the same implications as a failure of ROM 85; therefore, ROM 86 runs microprogram sequence ten for its four comparator modules.

If one of the eight storage modules $89_1$ to $89_4$ or $90_1$ to $90_4$ fails, the system is reconfigured, and runs at reduced speed. If one storage module in the group fails, both merge operations and address control will be affected for the respective comparator modules. This failure has the same implications as a ROM failure.

An alternative system architecture is shown in FIG. 8. This embodiment represents a more flexible and compact treatment of the storage control functions. The storage control elements (SCEs) 101 and 102 contain the control ROMs 103 and 104. These control ROMs guide the operation of the 17-way multiplexers $101_1$, $101_2$, $101_3$, $101_4$ and $102_1$, $102_2$, $102_3$, $102_4$. The inputs to each 17-way multiplexer are the H and L outputs of the eight comparator modules 41 to 48 (i.e., HA, LA, HB, LB, HC, LC, HD, LD, HE, LE, HF, LF, HG, LG, HI, and LI) and a special internal input used at initialization.

These 17-way multiplexers perform the same function as the 14-way multiplexors 73 (MUXA) and 74 (MUXB) shown in FIG. 6. The 17-way multiplexors provide more flexibility by allowing each comparator module 41 to 48 access to all outputs of the other seven comparator modules. Also, since the MUXA and MUXB functions are removed from comparator modules 41 to 48, the pin count is reduced on these modules.

Four internal arrays for each SCE, $101_5$, $101_6$, $101_7$, $101_8$, and $102_5$, $102_6$, $102_7$, $102_8$, are used to hold the indices during the merge operations, as in the embodiment shown in FIG. 7. A 16-element result register, $101_9$ and $102_9$, is used by each SCE to store the results of the sort operation. An ALU $101_{10}$ is used with an offset register $101_{11}$ to translate the stored indices to ADDRESS_Ps in SCE 101, and a similar ALU $102_{10}$ and corresponding offset register $102_{11}$ perform the same function in SCE 102. All these elements are brought into the SCEs 101 and 102 to form a more compact structure.

Each of the storage elements 105, 106, 107, and 108 contains eight internal arrays. These internal arrays are 16-elements deep to store the ADDRESS_Ws, as compared to the two arrays, 256-elements deep used in the embodiment shown in FIG. 7. The four storage element arrays 105, 106, 107, and 108 have respective pointer arrays 110, 111, 112, and 113. These arrays are used to accumulate the ADDRESS_Ws during the sort and merge operations. The storage element arrays 105, 106, 107, and 108 only temporarily hold the ADDRESS_Ws which are transferred to the pointer arrays 110, 111, 112, and 113, respectively. The final results are transferred to pointer arrays 114 and 115.

The two pointer arrays 114 and 115 are used as basic input/output paths to other database processing hardware units and to sort the final sort-merge results. The pointer arrays 114 and 115 are implemented as 2K×16 memory chips.

The embodiment shown in FIG. 8 is distinguished by a bidirectional bus 116 which connects the SCEs 101 and 102 to allow global simultaneous loading and any-to-any connectivity. This feature allows the high performance sort hardware shown in FIG. 8 to be extended from sort and merge operations to table, search, join, and set operations with the appropriate controls.

In operation, the HPS system has three modes of operation: 1) sort, 2) sort-merge, and 3) parallel merge. During the sort mode, all of the comparator modules work in unison. They are controlled by the same microprogram sequence in the control ROMs. This microprogram sequence defines the Van Voorhis algorithm. During the sort-merge mode, all of the comparator modules work in unison and are controlled by the same microprogram sequence in the control ROM, but only the first four cycles of the Van Voorhis algorithm are executed to produce an output. Each comparator module has two internal arrays, and each array is loaded by taking the first data record from sixteen sorted lists. When the merge output causes a data record to be removed, the storage control element replenishes that comparator module's array with the next data record from the same list that was output. During the parallel-merge mode, the storage controller element loads the first sixteen elements from two presorted lists into each comparator module. Since each comparator module has two different lists, a total of sixteen different lists are loaded into the eight comparators. Each comparator then individually merges the two lists by using the incrementors 58 and 59 in FIG. 6 to increment the address of the array with the largest (or smallest) data record. The index of the largest (or smallest) data record is output to port 71 or port 72 in FIG. 6 and stored in the merge result registers in the corresponding SCE for that comparator. All comparator modules work independently.

The sort mode performs a sixteen-way sort using the Van Voorhis sort network. Thirty-two cycles are required to load all comparator modules with sixteen QWs. Nine cycles are required to execute the Van Voorhis algorithm. Since the working store may have up to 2048 QWs, $((32+9) \times 128)+32=5280$ cycles are required to sort working store into 128 groups of sixteen.

The parallel merge mode performs a parallel merge of sixteen presorted lists into eight sorted lists. 128 lists of sixteen elements can be merged into sixty-four lists of thirty-two elements in $((64 \times 2)+32) \times 8=1280$ cycles.

The sort-merge mode uses the first four cycles of the Van Voorhis algorithm to merge sixteen lists into one list. After the fourth cycle of the Van Voorhis algorithm, the largest and smallest elements are known. For a descending sort-merge, the largest value is removed from the comparator modules and replaced with the next item in the list it came from. A sort-merge of sixteen lists of 128 elements takes $(2032 \times 10)+36=20,356$ cycles.

When list elements are composed of multiple QWs, a comparator module may have to reference the second pair or third pair, etc., to resolve a comparison. Provision for this has been designed into the comparator modules. Normally, only sixteen QW pairs are loaded into the comparator chip. The seventeenth pair of QW slots in the imbedded arrays are reserved for the resolution of multiple QW fields.

Initially, the working store is stored into groups of sixteen. If the final group is less than sixteen QWs, pad QWs are used during the sort mode. Counters are provided so that uneven lists can be merged.

ECC is checked on QW inputs to the comparator chip. Parity is used on all other data and control lines. Self-diagnostic capability is provided by loading known values into the comparator chips, execute a sort, and then check for proper operation in the two storage control chips.

The sort operation proceeds as follows:

| No. Cycles | Operations |
| --- | --- |
| 5,280 | Use sort mode to produce 128 sorted lists, each sixteen elements long. |
| 1,280 | Use parallel merge mode to get sixty-four sorted lists of thirty-two. |
| 1,280 | Use parallel merge mode to get thirty-two lists of sixty-four. |
| 1,280 | Use parallel merge mode to get sixteen sorted lists of 128. |
| 20,356 | Use sort-merge mode to get one list of 2048. |
| 29,476 cycles. | |

Note that in this example, the parallel merge mode is non-optimal for cases with less than sixteen lists, so the sort-merge mode is more advantageous.

The invention thus provides a novel state machine implementation of the Van Voorhis sort network, thereby avoiding the excessive module and pin count of the original Van Voorhis sort network would require. The specific implementations utilize high speed cache-like structures to eliminate quadword data busses. The system architectures provide fault-tolerant implementations of the Van Voorhis sort network. Additional flexibility is achieved by allowing variable field lengths and list lengths to be sorted. The resulting implementations provide processing speeds that exceed either the binary merge sort algorithm or the tree merge algorithm.

While the invention has been described in terms of two preferred embodiments, those skilled in the art will recognize that the invention can be practiced with modification within the spirit and scope of the appended claims.

Having thus described my invention, what I claim as new and desire to secure by Letters Patent is as follows:

1. High performance sort hardware for a database accelerator comprising:

working store means for storing data records to be sorted;

a plurality of comparator modules, said plurality of comparator modules each including cache storing means for storing records from said working store means and providing high speed access to stored records, data in said cache storing means of each of said plurality of comparator modules being identical data, said plurality of comparator modules each further including comparator means for selecting records stored in said cache storing means in a predetermined ascending or descending order and generating comparator outputs according to said predetermined order; and control means for loading said comparator outputs of said plurality of comparator modules in said working store means in a sequence of cycles which implements a sort algorithm as a state machine, wherein each of said comparator modules have access to all digits of said data values to be sorted.

2. High performance sort hardware as recited in claim 1 wherein records are stored in said cache storing means by real addresses where a sequence in which said records are loaded is identified by an index, said comparator outputs being identified in terms of said index and results of a sort being identified in terms of said index, said high performance sort hardware further including translation means for translating said index after the sort to a real address.

3. High performance sort hardware as recited in claim 2, wherein said translation means comprises a plurality of storage control elements coupled to said plurality of comparator modules for providing said real address to said working store means, said data in the logical arrays of each of said comparator modules requiring only addresses of data to be transferred between comparator modules.

4. High performance sort hardware as recited in claim 3, wherein said plurality of storage control elements each include a plurality of storage elements, an arithmetic logic unit, and a pointer array coupled to said arithmetic logic unit.

5. High performance sort hardware as recited in claim 2 wherein said cache storing means in each of said plurality of comparator modules comprises a plurality of imbedded logical arrays functioning as a high speed cache for the comparator module.

6. High performance sort hardware as recited in claim 1, wherein said plurality of comparator modules comprises eight comparator modules operating in nine cycles and wherein said sort algorithm is a Van Voorhis $n=16$ sort network, where n specifies how many elements are to be sorted.

7. High performance sort hardware for a database accelerator comprising:

working store means for storing data records to be sorted;

a plurality of comparator modules, said plurality of comparator modules each including cache storing means for storing records from said working store means and providing high speed access to stored records, data in said cache storing means of each of said plurality of comparator modules being identical, said plurality of comparator modules each further including comparator means for selecting records stored in said cache storing means in a predetermined ascending or descending order and generating comparator outputs according to said predetermined order; and control means for loading said comparator outputs of said plurality of comparator modules in said working store means in a sequence of cycles which implements a sort algorithm as a state machine, wherein each of said plurality of comparator modules comprises first and second imbedded logical arrays functioning as a high-speed cache and storing data to be compared, said data in the logical arrays of each of said comparator modules requiring only addresses of data to be transferred between comparator modules.

8. The high performance sort hardware according to claim 7, wherein said comparator means is connected to receive data read out of said first and second imbedded logical arrays and generates a comparator output indicative of a comparator operation on said data.

9. The high performance sort hardware according to claim 8, wherein each of said plurality of comparator modules further comprises first and second address register means for addressing data in said first and second imbedded logical arrays, respectively, addressed data being read out of said first and second logical arrays to said comparator means.

10. The high performance sort hardware according to claim 9, wherein each of said plurality of comparator modules further comprises first and second multiplexer means each receiving addresses from said first and second address register means and responsive to said comparator output of said comparator means for respectively outputting one of said addresses as a high output and one of said addresses as a low output.

11. The high performance sort hardware as recited in claim 10, wherein records are stored in said cache storing means by real addresses where a sequence in which said records are loaded is identified by an index, said comparator outputs being identified in terms of said index and results of a sort being identified in terms of said index, said high performance sort hardware further including translation means for translating said index after the sort to a real address, wherein said translation means comprises a plurality of storage control elements coupled to said plurality of comparator modules for providing said real address to said working store means, said data in the logical arrays of each of said comparator modules requiring only addresses of data to be transferred between comparator modules.

12. The high performance sort hardware as recited in claim 11, wherein said plurality of storage control elements each include a plurality of storage elements, an arithmetic logic unit, and a pointer array coupled to said arithmetic logic unit.

13. The high performance sort hardware as recited in claim 12, wherein said plurality of comparator modules comprises eight comparator modules operating in nine cycles and wherein said sort algorithm is a Van Voorhis $n=16$ sort network, where n specifies how many elements are to be sorted.

* * * * *